United States Patent [19]

Durand et al.

[11] 4,377,324

[45] Mar. 22, 1983

[54] GRADED INDEX FABRY-PEROT OPTICAL FILTER DEVICE

[75] Inventors: William W. Durand, Edina; Anil K. Jain, New Brighton; Ronald E. Peterson, Shoreview, all of Minn.

[73] Assignee: Honeywell Inc., Minneapolis, Minn.

[21] Appl. No.: 175,159

[22] Filed: Aug. 4, 1980

[51] Int. Cl.³ .............................................. G02B 5/28
[52] U.S. Cl. .................................... 350/166; 356/352
[58] Field of Search ............... 350/164, 166, 316, 1.6, 350/1.7; 356/352

[56] References Cited

U.S. PATENT DOCUMENTS 3,468,594  9/1969  Vogl et al. ........................ 350/164
3,473,030  10/1969  Meuers et al. ....................... 372/31
3,660,777  5/1972  Erickson .............................. 372/14

OTHER PUBLICATIONS

Smith, *Modern Optical Engineering*, pp. 167-175, McGraw-Hill, 1966.

*Primary Examiner*—Bruce Y. Arnold
*Attorney, Agent, or Firm*—Charles J. Ungemach

[57] ABSTRACT

A Fabry-Perot filter device comprising a pair of low index substrates having a refractive index of less than 2.4 and mounted in parallel relationship so as to present facing sides to each other in an optical path. A coating is placed on the facing sides of each of said low index substrates, the coating having an increasing index of refraction away from the sides from about that of the substrate to above 4.0 such that the index increases in increments of from at least 2 steps to continuously. The total coating thickness is on the order of the light wavelength or more. Means are also provided to adjust the distance between the two faces, at least from a distance of from substantially less than a desired wavelength to at least one-half of the desired wavelength.

5 Claims, 2 Drawing Figures

GRADED INDEX FABRY-PEROT OPTICAL FILTER DEVICE

BACKGROUND OF THE INVENTION

Conventional Fabry-Perot filters employ two windows with a high reflective coating on adjacent faces which are separated by a distance on the order of the light wavelength. Such filters transmit at a maximum wavelength of twice the spacer thickness. At other wavelengths, the device blocks the transmission of light. These devices also operate over a limited wavelength range.

U.S. Pat. No. 3,660,777 discloses apparatus for a Q switching carbon dioxide laser operating on the scanning Fabry-Perot principle to effect a laser switching device. The device uses mechanical shock to change the transmission of the Fabry-Perot inferometer.

U.S. Pat. No. 3,471,800 discloses a multiple Fabry-Perot etalon using several reflective surfaces, where two solid layers have a first refractive index and a gaseous layer of lower refractive index seperates them.

U.S. Pat. No. 3,834,795 discloses a Fabry-Perot filter which is used as a visual shutter. Again a single reflective layer or mirror coating is placed on each substrate in the Fabry-Perot cavity.

SUMMARY OF THE INVENTION

It has now been discovered that a new and useful Fabry-Perot filter can be obtained employing the principles of the present invention. By the use of a graded index region, as described hereinafter, a new property can be achieved. When the spacer thickness is approximately one-half the design wave-length, the usual narrow pass band is obtained. However, when the spacer thickness is decreased to much less than the design wavelength, the device transmits at all wavelengths in the vicinity of the design wavelength. This ability to open up the pass band to let a broad range of wavelengths through is an extremely useful property for many devices.

Specifically, a Fabry-Perot filter device has been discovered which includes a pair of low index substrantes having a refractive index of less than 2.4. These pair of substrates are mounted in parallel relationships so as to present facing sides to each other in an optical path. A coating is placed on facing sides of each of said low index substrantes, this coating having an increasing index of refraction as it moves away from the sides, from about that of the substrate adjacent the side to about above 4.0 on the facing side. The index increases in increments of at least two steps to continuously with the total coating thickness being on the order of the light wavelength ore more. Means to adjust the distance between the spacers is also provided.

In a preferred embodiment, the adjustment means is adapted to move the faces from a distance of from substantially less than a design wavelength to at least one-half the design wavelength. It will be shown hereinafter, that a light wave passes through the device when the separation distance is approximately one-half of that design wavelength. Because of the unique nature of the graded index of the present invention, a substantial band of light passes when the spacing distance is substantially less than the design wavelength.

Suitable materials for the substrate are silicon dioxide, barium fluoride, potassium chloride, potassium bromide, potassium iodide, cesium bromide, cesium iodide and zinc selenide or other transparent low refractive index materials. The material from which the coating is made can be a variety of materials having different indexes of refraction ranging from less than about 2.4 to greater than about 5.6. Alternatively, the coating can be a single material in which the relative proportion of the two components is varied to vary the index of refraction at any one point away from the substrate. Titanium dioxide, magnesium fluoride, lead telluride, bismuth telluride, geranium telluride and germanium are suitable high refractive index materials for the coating.

BRIEF DESCRIPTION OF THE DRAWINGS

For a more complete understanding of the invention, reference is hereby made to the drawings, in which.

DESCRIPTION OF THE PREFERRED EMBODIMENT

Figure 1:
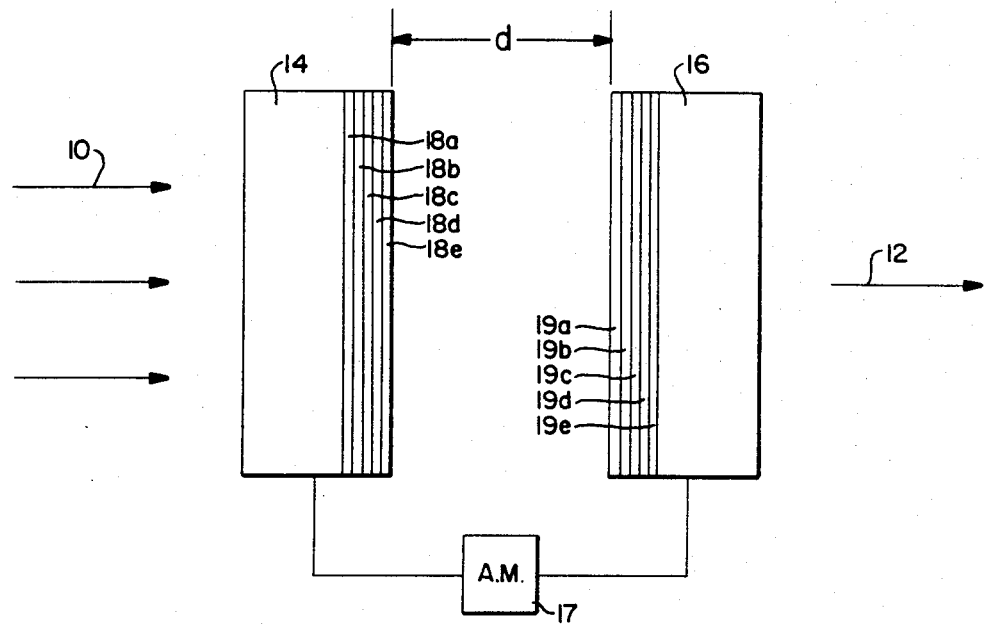
FIG. 1 is a schematic view showing the preferred embodiment of the present invention.

As shown in FIG. 1 light waves 10 are passing through a Fabry-Perot optical filter such that a quantity of light passes completely through the device in the direction of arrow 12. The device includes a pair of low index substrates 14 and 16 which have an index of refraction less than 2.4. Substrates 14 and 16 are mounted in a parallel relationship so as to present facing sides to each other in the optical path. A coating 18 and 19 is placed on the facing sides of each said low index substrates 14 and 16, said coatings having an increasing index of refraction 18a through 18e and 19e through 19a away from the sides of the substrates 14 and 16 from about that of the substrate adjacent the sides of 14 and 16 to above 4.0 at levels 18e and 19a. Adjustment means 17 is provided to adjust the distance between the side faces. Distance d represents the distance between the faces.

Figure 2:
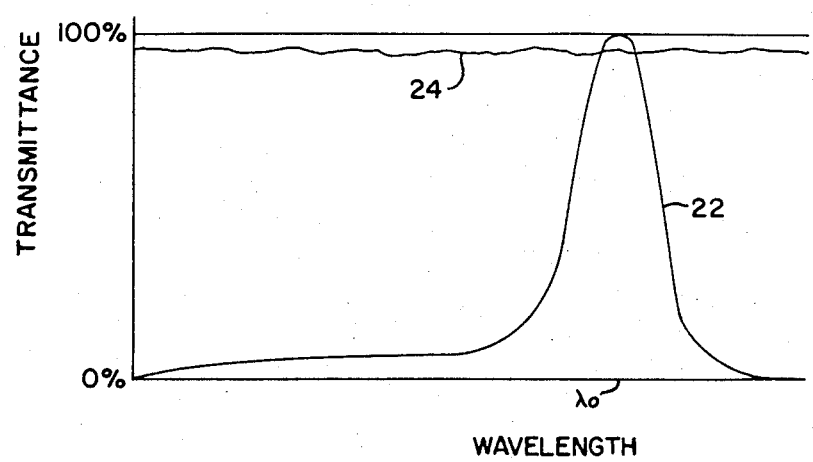
FIG. 2 is a graphical representation of results achieved using the device of FIG. 1.

As shown in FIG. 2, the percentage of light transmitted when distance d is approximately one-half of the design wave length $\lambda_o$, is shown by curve 22. This narrow passband is obtained in the conventional manner. However, when the distance d is substantially less than $\lambda_o$, the percentage of transmission is represented by line 24 of FIG. 2 which is nearly 100% transmission over a substantial wavelength range. The particular data shown in FIG. 2 was schieved with a potassium chloride substrate having an index of refraction of approximately 1.7 and a coating with varying proportions of lead telluride and potassium chloride giving an index of refraction gradually increasing continuously from that of the substrate to a facing side of approximately 5.6.

Having thus described the invention, what is claimed is:

1. A Fabry-Perot filter device, comprising:
   a pair of low index substrates having a refractive index of less than 2.4 and mounted in parallel relationship so as to present facing sides to each other in an optical path;
   a coating on the facing sides of each of said low index substrates, said coating having an increasing index of refraction away from said sides from about that of the substrate adjacent said sides to above 4.0 on said facing sides in increments of from at least 2 steps to continuously with the total coating thickness being on the order of the light wavelength or more; and adjustment means to adjust the distance between said faces.

2. The device of claim 1, wherein said adjustment means is adapted to move said faces from a distance from substantially less than a desired wavelength to at least one-half a desired wavelength.

3. The device of claim 1, wherein said increments include at least 5 steps.

4. The device of claim 1, wherein said substrates are selected from the group consisting of silicon dioxide, barium fluoride, potassium chloride, potassium bromide, potassium iodide, cesium bromide, cesium iodide and zinc selenide.

5. The device of claim 1, wherein said coating on said facing sides includes material selected from the group consisting of titanium dioxide, magnesium fluoride, lead telluride, bismuth telluride, germanium telluride and germanium.

* * * * *